Jan. 10, 1967   R. W. CAMPBELL ETAL   3,297,926
VEHICLE PROPULSION AND CONTROL SYSTEM
Filed Oct. 19, 1961   6 Sheets-Sheet 3

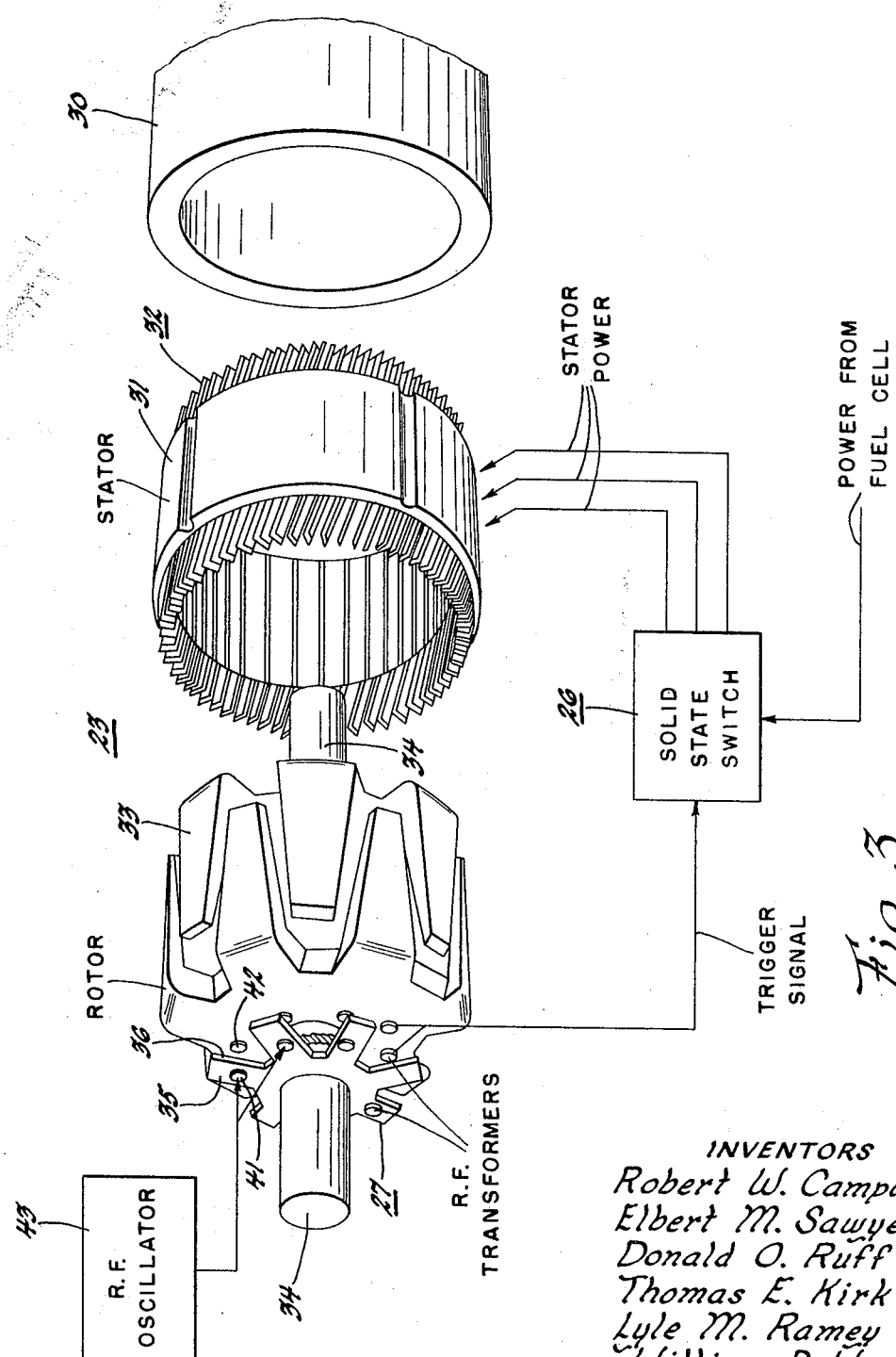

INVENTORS
Robert W. Campbell
Elbert M. Sawyer
Donald O. Ruff
Thomas E. Kirk
Lyle M. Ramey
William D. Worrell
BY Albert H. Reuther
THEIR ATTORNEY INVENTORS
Robert W. Campbell
Elbert M. Sawyer
Donald O. Ruff
Thomas E. Kirk
Lyle M. Ramey
William D. Worrell
BY Albert H. Reuther
THEIR ATTORNEY Jan. 10, 1967    R. W. CAMPBELL ETAL    3,297,926
VEHICLE PROPULSION AND CONTROL SYSTEM
Filed Oct. 19, 1961    6 Sheets-Sheet 5
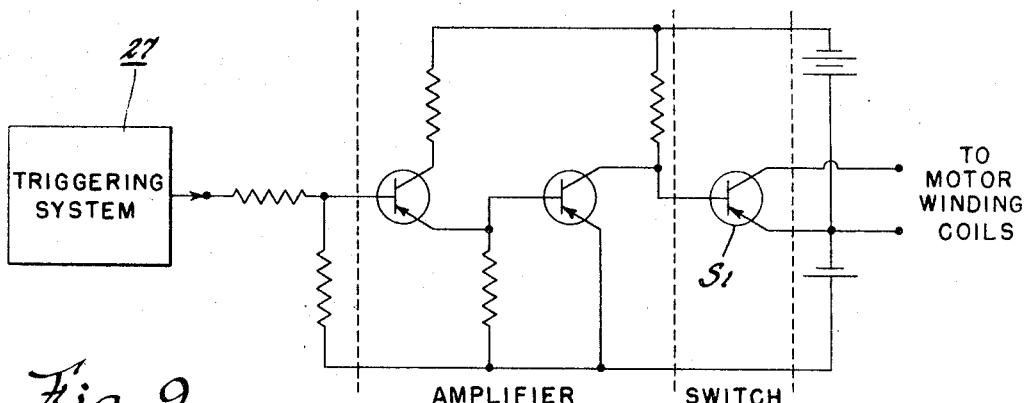
Fig. 9
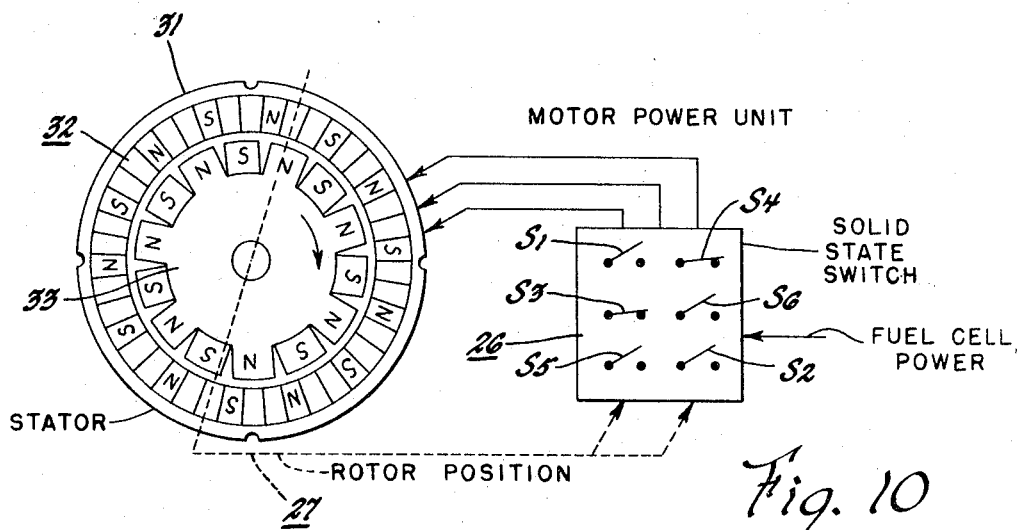
Fig. 10
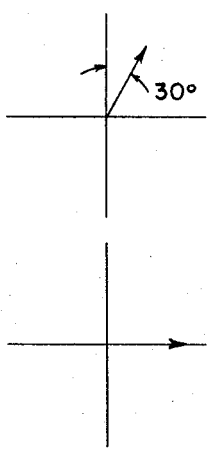
Fig. 11
Fig. 12
INVENTORS
Robert W. Campbell
Elbert M. Sawyer
Donald O. Ruff
Thomas E. Kirk
Lyle M. Ramey
William D. Worrell
BY
Albert H. Reuther
THEIR ATTORNEY Jan. 10, 1967   R. W. CAMPBELL ETAL   3,297,926
VEHICLE PROPULSION AND CONTROL SYSTEM
Filed Oct. 19, 1961   6 Sheets-Sheet 6
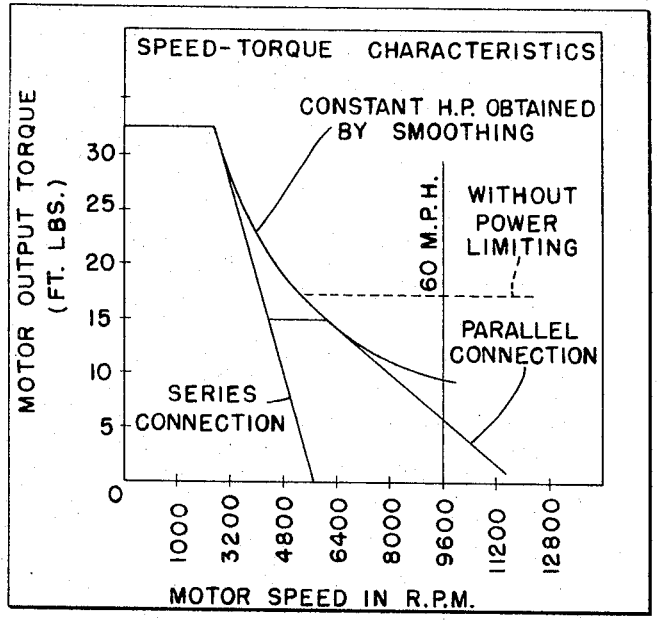
Fig. 18
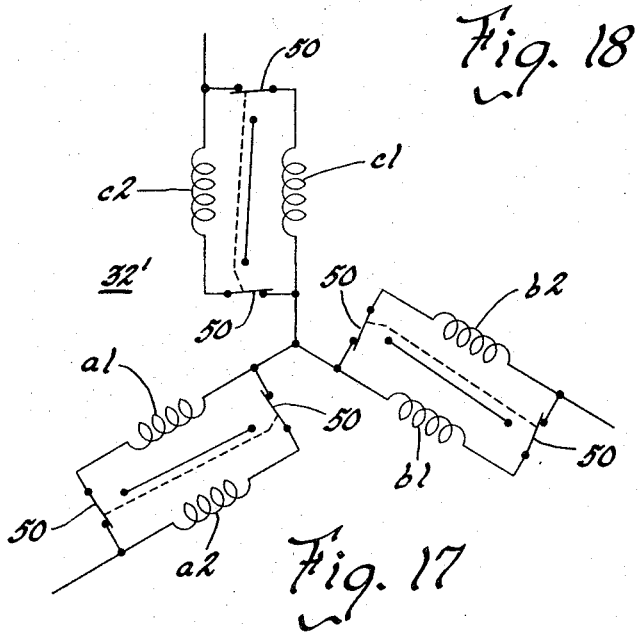
Fig. 17
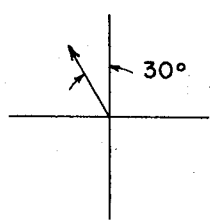
Fig. 16
Fig. 13
Fig. 14
Fig. 15
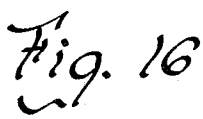
INVENTORS
Robert W. Campbell
Elbert M. Sawyer
Donald O. Ruff
Thomas E. Kirk
Lyle M. Ramey
William D. Worrell
BY
Albert H. Reuther
THEIR ATTORNEY

United States Patent Office 3,297,926
Patented Jan. 10, 1967

3,297,926
VEHICLE PROPULSION AND CONTROL SYSTEM
Robert W. Campbell, Elbert M. Sawyer, Donald O. Ruff, Thomas E. Kirk, Lyle M. Ramey, and William D. Worrell, all of Anderson, Ind., assignors to General Motors Corporation, Detroit, Mich., a corporation of Delaware
Filed Oct. 19, 1961, Ser. No. 146,180
6 Claims. (Cl. 318—138)

This invention relates to electrically operable vehicles and, more particularly, to a vehicle propulsion and control system that can function free of any contacts or commutator subject to wear and maintenance problems.

An object of this invention is to provide a new and improved motor system which includes three basic sections such as a polyphase synchronous machine, a switching matrix formed of solid state devices, and a triggering means which is shaft-position oriented to control the switching function and which structurally can be built into the polyphase motor or machine.

Another object of this invention is to provide a triggering means for sequentially programmed energization of multiple poles of an electrically rotating stator field utilizing an A.C.-type winding that performs a commutating function for a D.C. machine having a rotor shaft to drive a non-magnetic metal member slotted at predetermined locations to permit instantaneous radio-frequency transformer coupling to control gating or triggering of solid state semi-conductor switching devices arranged and properly timed to accomplish this rotation of the stator field in accordance with rotor position indication provided, in effect, by the non-magnetic metal member which interrupts transformer coupling except where slotted.

Another object of this invention is to provide a solid state switching system effective in control of metering of power for energization of an A.C.-type stator winding that performs a commutating function free of speed limitations and problems associated with commutators and brushes though subject to instantaneous start of conduction by silicon controlled rectifier (SCR) devices provided in corresponding even-numbered increments for on-off switching operation to effect reversal of energizing current polarity progressively in an A.C. excited electrically rotating stator field of a D.C. machine operable at speeds from zero or stall condition to high speed up to 10,000 r.p.m. and the like.

A further object of this invention is to provide a brushless machine having reduced weight per horsepower output from a rotor thereof that moves within a progressively-energized rotating A.C. excited stator field in response to pickoff and switching to give D.C. motor characteristics by use of an A.C.-type Y connected winding having coil means series-parallel connectable variously and progressively during starting as well as running operation to provide electrical shift between high and low speed for differing torque under control of semi-conductor devices subject to programmed signal pickoff for interruption and triggering thereof to establish interconnection of coil means instantaneously to provide an electrically rotating field for the stator of the brushless machine.

Another object of this invention is to provide an electric vehicle propulsion and control system utilizing a self-synchronized three-phase machine and gearbox at each wheel operable from D.C. power such as a battery, fuel cell, space actuators and the like as well as A.C. power such as a road-track circuit and the like subject to field current control means, stator winding switch means for series-parallel connection of Y type coil windings of the machine as well as optional reversal and static solid state commutation accompanied by triggering of a switching program to alter sequentially current vector angles to result in instantaneous and progressive shift of the stator field to lead the rotor for continuous rotation under resultant attraction and repulsion of rotor poles thereby creating torque at a relatively low weight of machine in pounds per horsepower.

Further objects and advantages of the present invention will be apparent from the following description, reference being had to the accompanying drawings wherein preferred embodiments of the present invention are clearly shown.

In the drawings:

FIGURE 3 is a perspective exploded view schematically illustrating a polyphase machine equipped with triggering means for static semi-conductor switching means to establish progressively programmed energization of an electrically rotating stator field in accordance with the present invention.

FIGURE 9 is a circuit diagram of transistor switching control for use with the machine of FIGURE 3 and circuitry of FIGURE 7.

FIGURE 10 is a schematic illustration of the principle of propulsion motor operation in accordance with the present invention.

FIGURES 11, 12, 13, 14, 15 and 16 illustrate progressive change of position of stator current vectors during the six switching combination positions represented by the chart of FIGURE 8 and instrumental in operating under the principle of a rotating field for the stator of the brushless D.C. machine having A.C.-type stator winding means in accordance with the present invention.

FIGURE 17 illustrates schematically an A.C.-type stator winding having series-parallel connectable portions in each branch of Y type coils.

FIGURE 18 is a graphical representation of speed-torque characteristics obtainable by use of components in accordance with the present invention utilizing differing connections therewith as possible with series-parallel arrangement of portions of Y type A.C. winding coils illustrated in FIGURE 17.

Utility of electrically powered vehicles for general use has been limited in the past due primarily to restricted energy per unit weight available from bateries and the like which required frequent recharging. In recent years improvements have been made in sources of electrical power such that availability thereof is more promising for longer periods of time such as from a fuel cell and the like. However, it is to be noted that features of the components of the present invention can be used on variously powered vehicles which can utilize a gas turbine engine, diesel-generator supply unit, as well as other sources of power such as could become available from an electronic road-track circuit and the like.

To make electrically powered vehicle propulsion practical, there is a need for motor means and controls therefor which are both compact and relatively light in weight yet which can provide sufficiently practical horsepower output in proportion to total weight of the motor and control system such that use thereof is permissible. For example, currently, D.C. motors will require maintenance for commutation with brushes particularly for higher speed operation such that a lower speed would be dictated and would result in greater weight. If a motor vehicle is to be provided with a minimum of between sixty and one hundred twenty-five horsepower and a rate of fifteen to thirty pounds per horsepower, it is apparent that over one thousand pounds of dynamoelectric machine would be presently required and such weight would be impractical. A goal of at least one pound per horsepower and thus a total of between one hundred and one hundred twenty-five pounds weight with approximately twenty-five to thirty pounds of weight per wheel would be acceptable for powering an electrically operable vehicle. However, conventional commutation accompanied by maintenance problems due to heavy currents and the like have previously hampered use of such dynamoelectric machines in wheels, at least for purposes of a small vehicle suitable for passengers and other transportation purposes.

Figure 1:
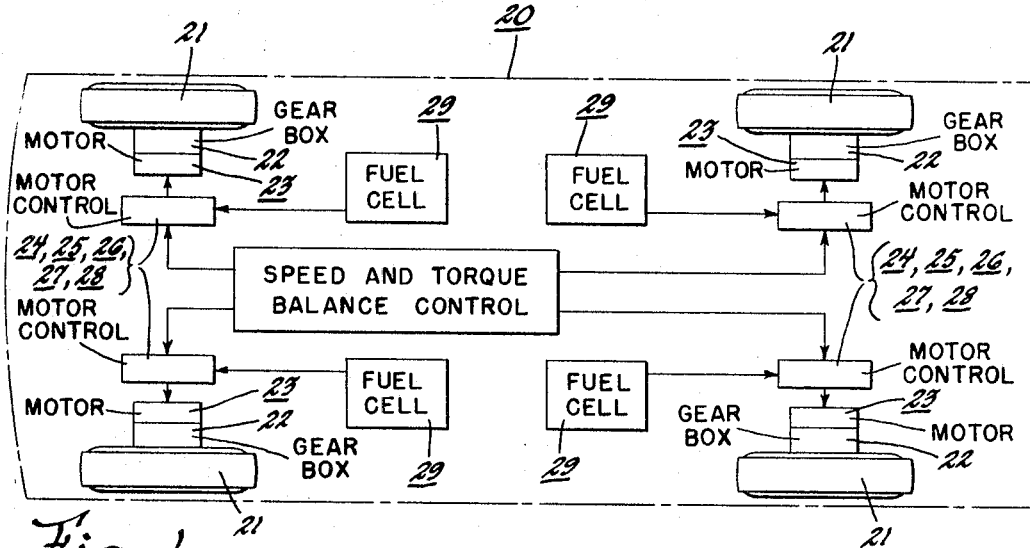
FIGURE 1 is a schematic plan view of a vehicle propulsion and control system having components in accordance with the present invention.
Figure 2:
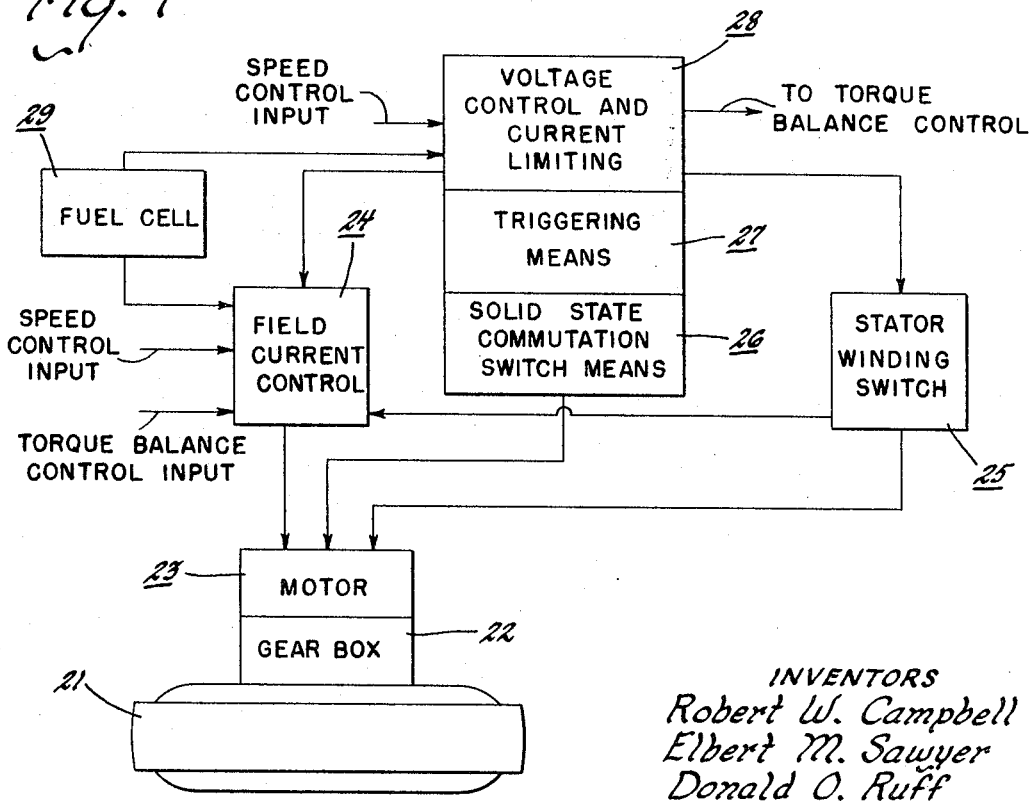
FIGURE 2 is a schematic diagram of components operable upon an individual wheel of the vehicle of FIGURE 1 and powered to be electrically driven and controlled in accordance with the present invention.

In FIGURE 1 there is outlined a vehicle generally indicated by numeral 20 having wheels 21 driven by a gearbox 22 from an electric motor or machine generally indicated by numeral 23. FIGURE 2 shows in a generalized control block diagram the components provided for electric motor operation and control including, particularly, a field current control means generally indicated by numeral 24 as well as a stator winding switch means generally indicated by numeral 25 and a solid state or semi-conductor stator field coil switching means 26 and triggering means 27 for control of on-off operation of the solid state commutation switching means which preferably, in accordance with the present invention, include a plurality of silicon controlled rectifier (SCR) devices or transistors. Such SCR devices per se are commercially available and use thereof for components of the present invention will be more fully described herein.

As further indicated in FIGURE 2 of the drawings, a voltage control and current limiting means generally indicated by numeral 28 can be provided to permit tapping of a fuel cell means generally indicated by numeral 29 which in part also provides energization for the field control means 24. Fuel cell power to permit speed of operation between zero and sixty miles per hour and substantially thirty kw. of power could be required under ideal running conditions and considering over-all efficiencies of the D.C. machines or motors and other components of the present system. For acceleration purposes sometimes upwards to eighty-six kw. of electrical power from the fuel cell can be obtained for less than half a minute though upwards to forty-eight kw. of power could be used. The increase in power for acceleration can be handled by overloading the fuel cell for a short interval so long as repetition thereof is avoided which would cause an excessive temperature rise. It is to be noted that transistor or semi-conductor SCR devices of suitable material can also be used for tapoff of power from the fuel cell such as 29 in increments of power required to operate at a particular speed range.

The motor system consists of three basic sections including a polyphase synchronous machine or motor means 23, a switching matrix or solid state commutation means 26 and a magnetic pickup means or triggering system 27 which is shaft-position oriented as illustrated in FIGURE 3 and which controls the switching function. The triggering system can be built into the polyphase motor and the switches can be remote therefrom though it is to be understood that the motor can have a rotor on a shaft extended externally thereof so that a gear-drive can be provided between the shaft and triggering system which can be mounted adjacent to the motor means. The motor means can include a casing or housing 30 of which a fragment is shown in FIGURE 3. The exploded view of FIGURE 3 also shows a magnetic stator core 31 in perspective having a plurality of coils or stator winding means 32 fitted into slots thereof in a well-known manner. The wound stator has three-phase A.C.-type winding means or coils therewith and a rotor means 33 is provided on a shaft 34 suitably journalled to the housing 30. The stator winding is a fourteen-pole configuration and the rotor illustrated has fourteen poles suitably energized by permanent magnet means for brushless operation or electro-magnet means if smoothing of torque is to be available. This motor can be referred to as a self-synchronized three-phase machine and the motor is provided with a field coil means Y-connemted type A.C. winding to which D.C. power is supplied under instantaneous control by a switching matrix or semi-conductor switching means to be described in further detail. Use of a magnetic pickup or signal triggering means generally indicated by numeral 27 provides rotor position indication corresponding instantaneously to movement of the rotor relative to the stator so as to trigger the semi-conductor SCR devices in a switching pattern at a proper angle resulting in a shift in electrical energization of the stator field to lead the rotor as will be described in further detail herein.

Figure 5:
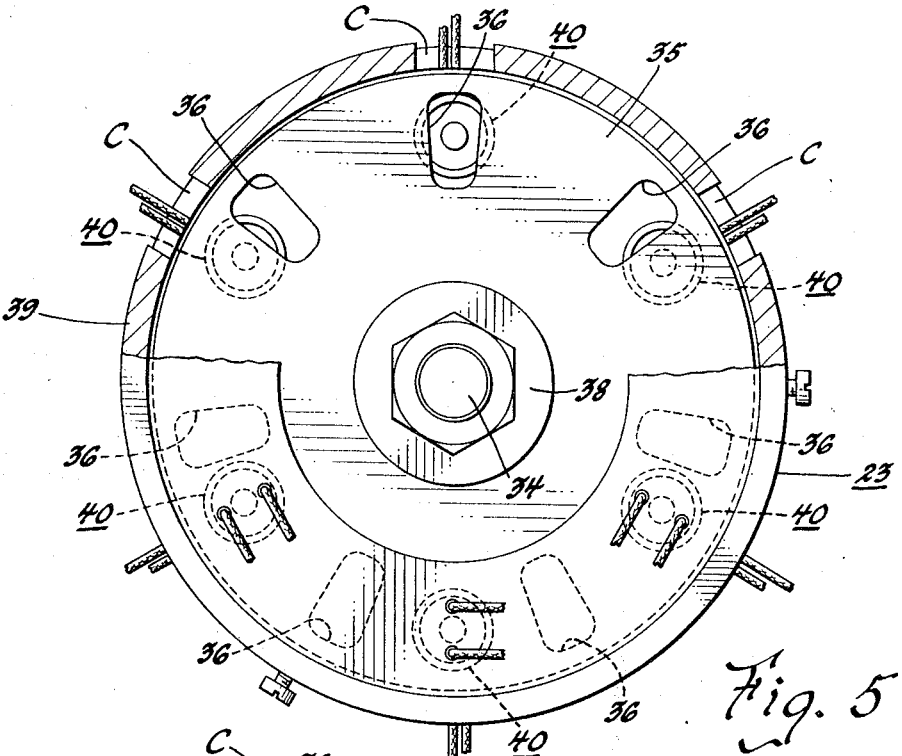
FIGURES 4 and 5 are side and end views of position-sensing triggering means for use with the machine of FIGURE 3.
Figure 4:
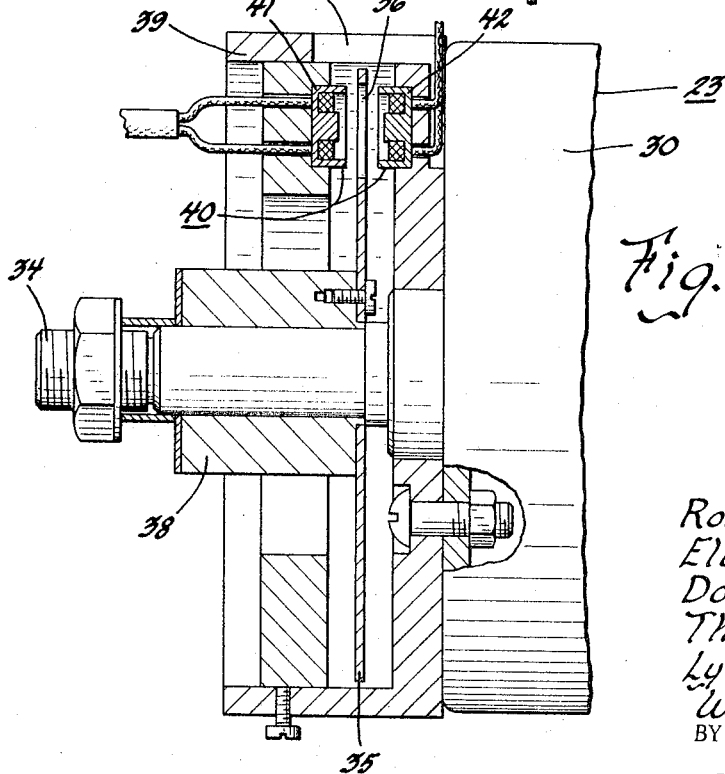

The triggering means 27 is shown schematically in FIGURE 3 and views of FIGURES 4 and 5 provide further details thereof. A non-magnetic metal member 35 having a total of seven radially extending slots or cutouts 36 therein can be suitably attached by fastening means 38 between the metal member or disc 35 of aluminum and the like journalled to rotate as carried by the rotor shaft 34. It is to be understood that in place of the hub-like fastening 38 utilizing set screws to secure the member or disc 35 of non-magnetic metal such as aluminum on the shaft it is also possible to have a gear-like or other positive drive between the shaft and the member or disc 35 relative to the shaft 34. The non-magnetic material member or disc 35 and hub-like fastening 38 are adapted to rotate with the shaft 34 inside a housing extension 39 which can be attached to or integral with the housing 30 of the motor. The housing extension 39 can be provided with suitable cooling passages or slots located radially outside and substantially in alignment with the outer periphery of the non-magnetic member or disc 35. Such an opening is indicated by reference C in the view of FIGURE 4. A total of six complementary radio-frequency transformer means generally indicated by numeral 40 are mounted in the housing extension 39 on opposite sides of the rotatable non-magnetic member or disc 35. These R-F transformer means 40 include first and second transformer portions 41 and 42 of ferrite material magnetic but not permanent magnets each having at least a few turns of wire for energization fitted around a substantially E-cross section thereof as indicated in FIGURE 4. The R-F transformer portions 41 and 42 are commercially available but use thereof in a magnetic pickoff means for triggering semi-conductor devices in accordance with the present invention makes possible features and operation in accordance with the present invention. Transformer portions have been provided with magnetic materials therebetween to permit variation in magnetic inductance but such a use differs from the features of the present invention in which a non-magnetic member or aluminum disc 35 is used to interrupt magnetic coupling between the transformer portions 41 and 42 at periodic intervals though allowing transformer coupling instantaneously for signal impulses as the cutouts or slots 36 in the member or disc 35 traverse therebetween. There is magnetic linkage and transformer flux coupling due to excitation of one transformer portion 41, for example, which when having only an air gap provided by the cutout or slot 36 axially relative to the second transformer portion 42 will result in inducing or exciting of a corresponding flux in the second transformer portion and this induced flux results in an R-F signal which is used to operate a triggering circuit.

Figure 6:
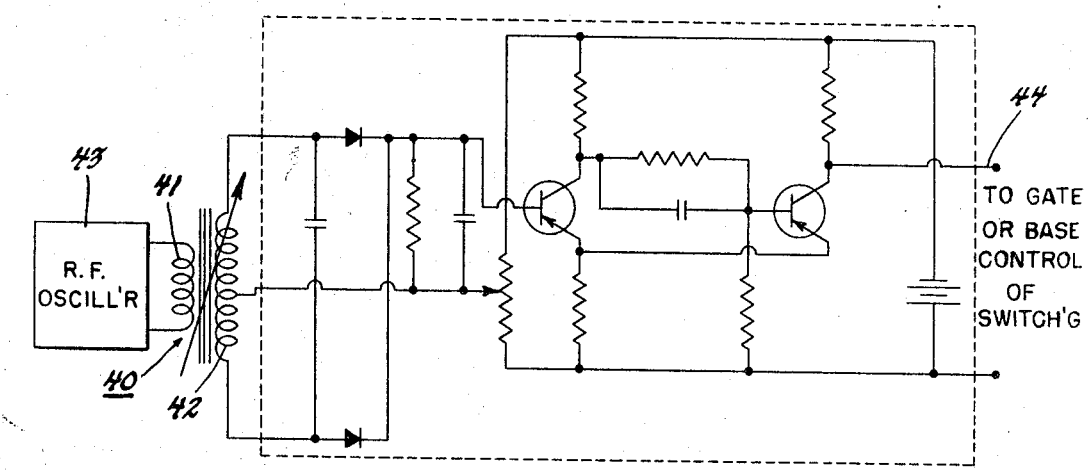
FIGURE 6 is a circuit diagram of a variable coupling triggering means as a component of a polyphase machine in accordance with FIGURES 3, 4 and 5.

The purpose of the triggering system is to relate a switching signal as to the rotor position of the motor. Use of small radio-frequency transformers having windings placed in ferrite cup cores or first and second transformer portions 41–42 thereof can be accomplished with a spacing of less than one inch between the open faces of the cups or transformer portions vis-a-vis. Energy is coupled from the primary to the secondary across this air gap and if a sheet or member of conductive though non-magnetic material is caused to pass in the gap between the cups, the energy transferred from the primary to the secondary is reduced to about one two-hundreth of that which existed without the conductive material in the gap. It can be readily seen that with a group of six such R-F transformers including twelve portions 41–42 can be provided in conjunction with seven cutouts or slots 36 such that six times seven or forty-two changes in signal can occur during one rotation of the shaft and member or disc 35 carried thereby. It is apparent that with a fourteen pole machine and a three-phase A.C.-type stator winding the multiplication of three times fourteen also results in a corresponding number forty-two on the three-phase fourteen pole machine. Magnetic coupling between windings of these transformer portions is periodically interrupted by the non-magnetic metal member or disc 35. FIGURE 6 illustrates one possible arrangement of one of a plurality of like units of this triggering system circuit utilizing a stationary oscillator 43 which energizes the first transformer portion 41 at radio-frequency powering such as one hundred seventy kilocycles and inducing signals in the second transformer portion 42 for each of the pair of transformer portions. The output signal from the second transformer portion can be demodulated and applied to a switching type circuit which produces a gating signal for the solid state semi-conductor switching device. The output voltage of the second transformer portion is rectified to D.C. and thus, a D.C. pulse is produced each time the notch, cutout or slot 36 of the member or disc 35 passes between the cores or first and second portions of transformer means 40. The circuitry illustrated by FIGURE 6 for driving the gating control is normally considered to be one of a plurality of corresponding parts of the over-all triggering system though detailed description thereof is deemed unnecessary since the circuit connections per se thereof can be modified. A D.C. amplifier or a suitable circuit such as a Schmitt trigger can be used and generally is the most satisfactory. The stability and precision of the triggering system is important to efficient motor operation. The triggering operation can be accomplished by any device which can indicate shaft position as a source of trigger information and a capacitive or magnetic proximity pickup as well as photoelectric pickup and synchros can be used. A complete triggering circuit for one pair of the total of six complemetary radio-frequency transformer means 40 is shown in FIGURE 6. Use of the magnetic pickoff using the R-F transformers has distinct advantages as to semi-conductor on-off operation.

Figure 7:
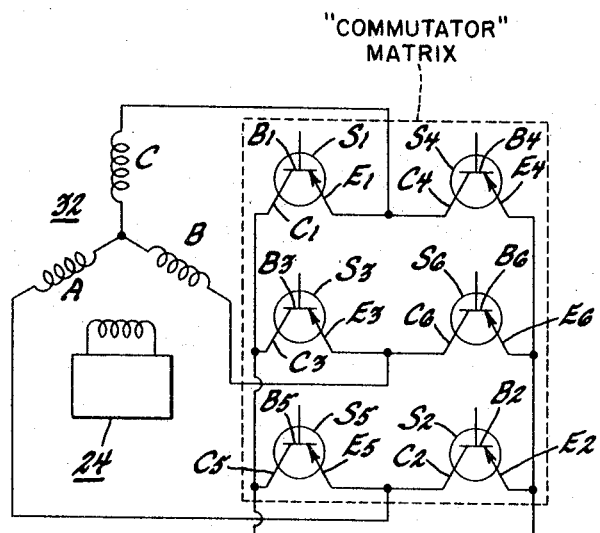
FIGURE 7 is a schematic illustration of circuitry for solid state commutation of the machine of FIGURE 3 and including components in accordance with the present invention.

Use of radio-frequency transformer means for magnetic pickoff in a triggering system is unique in that induction and de-coupling of the transformer devices by use of the rotating plate or disc can provide a rather definite and sharp on-off switching or gating signal for the SCR or transistor devices shown by schematic illustration of circuitry for solid state commutation. With reference to FIGURE 7 this circuitry includes the field current control means 24 noted in FIGURE 2 as well as a stator winding of an A.C.-type indicated by numeral 32 in FIGURE 3 and including Y-connected coils or winding means A, B and C as indicated in FIGURE 7. The "commutator" matrix or switching means includes a total of six semiconductor or transistor SCR devices labeled S–1, S–2, S–3, S–4, S–5 and S–6 which are supplied with energy or power from a suitable source such as a battery or tap-off for fuel cell 19 subject to voltage control and/or tap-off therefrom as provided by multiple transistor or SCR devices outlined by a box control 28. Each of the SCR semi-conductor or transistor devices includes a base (gate for SCR) electrode indicated by references B–1, B–2, B–3, B–4, B–5 and B–6 corresponding, respectively, to transistor (or SCR) devices 1 through 6. Similarly, each of the solid-state units includes emitter (cathode for SCR) electrodes labeled E–1, E–2, E–3, E–4, E–5 and E–6 corresponding to semi-conductor devices 1 through 6, respectively. Also, each of the semi-conductor devices includes collector (anode for SCR) electrodes identified by references C–1, C–2, C–3, C–4, C–5 and C–6 corresponding to transistors 1 through 6, respectively. The magnetic pickoff switching signal from the triggering means is supplied by way of transformer portions coupled periodically to transmit signals through an optional solid-state or vacuum tube amplifying and switching circuit to lead 44 and a condition prevails instantaneously wherein a small current from the gating or triggering impulse flows through the control-junction material of the SCR or transistor device which serves as a switch that is closed once such small current flows through the layer of control-junction material to create a bridge that permits a much larger current to flow through each of the respective semi-conductor devices. Each semi-conductor device is a switch-like rectifier as good as the best diodes though serving as a control capable of throttling kilowatts in stepless increments from zero to full power. Adequate heat sink mounting can be readily provided with cooling fins from which dust can be blown when necessary as determined by visual inspection though no further maintenance is generally required. Since there is no filament to burn out and nothing to deteriorate in the semi-conductor devices, they last indefinitely and efficiency is such that losses are only a small fraction of those in a conventional Thyratron tube. There is sharp on-off operation and instant start of conduction in a switch-like operation thereof since the semi-conductor devices have no filament requiring warm up. The physical size of the semi-conductor devices is relatively small so that a minimum of space is required thereby.

The main silicon semi-conductor portion of each such device has antimony and aluminum elements grafted thereto to form an SCR. The typical SCR device has a wafer-like sandwich of silicon one-tenth to one-half inch across and 0.010 inch thick. Electrical contact with one face (the cathode or emitter) of the sandwich is made through a layer of gold antimony with the other (the anode or collector) through a wafer of aluminum. A third contact (the gate) is made with the top layer of the silicon itself. With no voltage on the gate, the silicon sandwich acts as an insulator and prevents flow of current in either direction between the cathode and the anode. As soon as the gate terminal or base is made electrically positive and the cathode or emitter negative, a few thousandths of an ampere can flow through the gate circuit thereby triggering and permitting larger current flow as the condition of the silicon is changed from an insulator into a conductor. If the anode is electrically positive, the current will flow from the cathode to the anode and as long as the anode to cathode voltage remains high enough to keep a holding current flow, the SCR device will continue to conduct regardless of gate voltage. Once current drops below the predetermined holding current value, the semi-conductor becomes an insulator again and when voltage is reversed such that the cathode is positive and the anode negative, no current can flow regardless of gate voltage. Therefore, the SCR transistor device is a rectifier capable of conducting or switching heavy currents controlled by a few milliamperes of trigger current. This function is similar to that of a Thyratron tube with the advantage that the static SCR devices are unaffected by dust, corrosive fumes, moisture, noise, vibration, and the like. Use of proper cooling and heat sink provision can assure long and durable service without operating beyond a temperature of 100° to 150° C. above which overheating would occur which could damage or impair and cause failure of the SCR devices. Moisture can be effectively sealed out of semiconductor devices commercially available and thus use thereof in the "commutator" matrix or switching means in accordance with the present invention is particularly advantageous. Preferably, the triggering signals are provided in relatively square waves or impulses for fast switching action to assure off-on operation of the SCR devices. Such triggering signals of sufficient amplitude can also avoid switching losses in a transistor device which causes excessive heat generation. The Schmitt triggering circuit provides such square wave operation with a minimum of power loss in watts.

Figure 8:
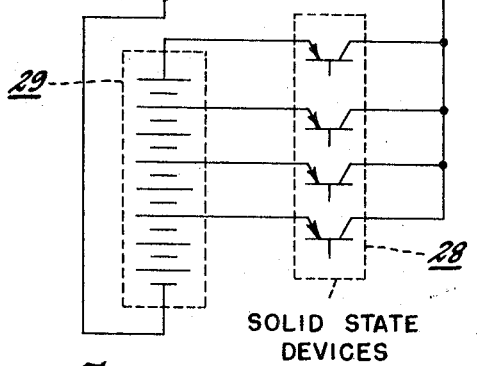
FIGURE 8 is a chart to illustrate programmed sequence of solid state switching devices during a representative portion of energization of an electrically rotating stator field of the machine of FIGURE 3.

The chart of FIGURE 8 illustrates sequence of operation of pairs of SCR transistor devices in the schematic circuitry of FIGURE 7 such that power supply to pairs of the Y-connected A.C.-type stator winding coils can occur. For starting purposes, the SCR devices S–1 and S–6 are triggered and a power circuit is completed through suitable connections or lead wires to permit passage of current from a suitable power source by way of SCR transistor devices S–6 through the coil portion B of the stator winding 32 as well as the coil portion C thereof by way of the SCR transistor device S–1. Similarly, after the start or sixth position wherein SCR devices and S–1 and S–6 are permitting circuit closure, there is a first position in which SCR devices S–1 and S–2 permit conduction of heavy current by way of coil portions A and C of the stator winding means 32. In the second sequential position of a notch or cutout-like slot of the disc or non-magnetic member 35 the SCR devices S–2 and S–3 permit passage of energizing current though coil portions A and B of the stator winding means 32. The function of the switching means or "commutator" matrix is to respond to the gating signals from the triggering system and switch the current in the motor stator windings. The switching must be done in a sequence which will cause the stator field to rotate. In a conventional D.C. motor this switching is accomplished by a commutator having brushes and rotating commutator segments. However, such a bulky and conventional commutator means is impractical because of current carrying capacity limitations and maintenance requirements. Therefore, solid state switching or SCR devices can be effectively used in the system in accordance with the present invention. Power transistors can be used for brushless D.C. machines at lower horsepower ratings since they are somewhat easier to apply and less expensive. However, the silicon-control rectifiers or SCR devices are suited to higher power motors.

A transistor can operate as a power switch if base current can be applied in sharp step functions "on" and "off." It is generally necessary to overdrive the base to be sure that the collector current goes into complete saturation and complete cutoff. Such a circuit as a monostable multivibrator circuit can provide the necessary pulse shape, but in any case where appreciable power is to be switched, a power amplifier stage is required between the multivibrator and the switching transistor. This will provide the necessary base drive to switch cleanly. One disadvantage of transistors for high power work is the large amount of base drive power required. This must be considered in the over-all motor efficiency rating and the decrease in efficiency due to transistor base drive is appreciable. The advantage of using transistors is that they can be turned on and off with the base current and no auxiliary turnoff means are necessary. FIGURE 9 of the drawings illustrates the manner in which transistors can be used in the switching matrix. Only one switch is shown in detail and it is to be understood that one such circuit is provided for each of the six transistor devices such as represented by the references S–1, etc. in the schematic circuit of FIGURE 7.

Use of silicon-control rectifier or SCR semi-conductor devices in D.C. circuits for repetitive switching previously has been hindered by the fact that such currently available devices cannot be turned off by reversing the signal which turned them on. Once they are turned on, they stay on until the current being conducted is reduced to zero. In A.C. circuits where the current goes through zero once each half cycle, SCR devices can be used effectively. In D.C. circuits, current must be forced to zero by some external means. The triggering means utilizing the magnetic pickoff described earlier provides for such external on-off gating of the SCR semi-conductor devices.

In FIGURE 10 there is an illustration of the third instantaneous position wherein SCR semi-conductor devices S–3 and S–4, for example, of the solid state switching means are closed to permit conduction. The triggering means references rotor positioning to the solid state switching means such that there are fourteen stator poles of alternate north and south polarity slightly ahead of the rotor means. In response to each of the six switching positions requiring conduction through pairs of SCR semi-conductor devices there is a progressive programming of this pattern of alternate north and south polarities through the fourteen poles such that forty-two radial positions indicated in FIGURE 10 have the polarity pattern of FIGURE 10 superimposed thereon in sequence. Thus, taking for example, the position eight which is provided with a north polarity in the third position it is to be understood that this north polarity will rotate electrically so far as the stator field is concerned to the position nine in the diagram of FIGURE 10 when the corresponding SCR semi-conductor devices S–4 and S–5 close the circuit connections through coil portions A and C of the stator winding means 32.

Views of FIGURES 11, 12, 13, 14, 15 and 16 illustrate positioning of stator coil current vectors in each of the six switching positions such that successive incremental angular changes in vector positioning occur by sixty electrical degrees from one position to the next in a programmed pattern. In the first position the net magneto motive force is thirty degrees to the right of the vertical and with proper timing a switching occurs to the second position wherein the current vector moves sixty degrees electrically from one north to the next north polarity such that the vector coincides with the ninety degree quadrant as illustrated in FIGURE 12. FIGURES 13, 14, 15 and 16 illustrate further positioning of the current vectors representing net magneto motive force. An overlap in switching is required for starting to avoid dead spots in the circuit. The triggering means senses positioning of the rotor and energizes the stator field accordingly into the six positions of the vectors or switching combinations for each of the even number of poles. The principle of operation is illustrated in the drawings for a fourteen pole machine though it is to be understood that any even number of increments and corresponding numbers of semi-conductor devices totalling two, four, six, eight, ten, etc. can be used. The changes in vector positioning as represented are set forth in electrical degree cycles. On a fourteen pole motor there will be forty-two switching operations or seven complete cycles. However, operation is not strictly on the principle of a rotating machine since as the stator field rotates the rotor field does so also while relative position of the fields is fixed as in a D.C. machine. Power metering units for each wheel of a vehicle can be provided for efficient operation.

Use of fragile and temperature sensitive Hall devices for switching transistors has been found to be deficient so far as stable triggering operation of such devices is concerned. Therefore, the magnetic pickoff utilizing radio-frequency transformer means and a non-magnetic material member or rotating disc or plate with seven slots for decoupling between the transformer devices periodically has been found to be most practical. In one mode of operation, the rotor follows the electrically rotating field in the A.C.-type stator winding coils and the rotor is slaved in effect in a manner similar to that encountered with a synchro motor. It is to be understood that the switch-like operations performed by the semi-conductor SCR devices and the like is similar to a valve control by signal from the rotor which in accordance with position indicated results in operation similar to that of a D.C. motor. The subject motor means and pickoff and switching system for use therewith could be used for machine tool stepping as well as for vehicle propulsion. As an advantage over a conventional D.C. machine, the subject motor means permits variation as to connection of stator windings.

FIGURE 17 illustrates a variation in connection of stator windings wherein each of the stator coil means A, B and C such as illustrated in FIGURE 7 are formed collectively by pairs of winding coils connectable in series or in parallel. These winding coils are represented by numerals $a-1$ and $a-2$ as well as $b-1$ and $b-2$ and $c-1$ and $c-2$ representing a stator winding means 32'. During starting operation the winding portions $a-1$ and $a-2$ can be connected in series by alternate positioning of switching devices 50 represented schematically in the view of FIGURE 17 but actually and physically also possibly being semi-conductor devices. At least double torque is obtained by having these coil portions in series during starting operation though only substantially one-half the speed can be obtained. However, for higher speed operation the coil portions $a-1$ and $a-2$ as well as $b-1$ and $b-2$ and $c-1$ and $c-2$ can be changed to parallel connection by the stator winding switch means generally indicated by numeral 25 in FIGURE 2 and including switch devices 50 as represented in FIGURE 17 so as to permit operation at higher speed.

FIGURE 18 illustrates graphically speed-torque characteristics available from a machine and control system in accordance with the present invention. In the range of 1,000 r.p.m. motor speed there is a flat portion of the curve representing substantially constant output torque above 30 foot-pounds. Values of torque above this value are unobtainable in view of limitations of the power source such as a fuel cell and the like. Maximum acceleration can occur along the flat portion of the torque-speed curve. The chart of FIGURE 18 illustrates the continuation and decrease of torque in response and accompanying increase of motor speed. This torque drops off sharply for continued series connection of the coil portions represented in FIGURE 17. By weakening the field energization through field current control means 24 it is possible to smooth transition between series and parallel connection of the field coil winding portions. Variation in the field current control can provide further flexibility in the operation of the motor propulsion and control system in accordance with the present invention. Since the source of power is limited to a maximum value, the speed-torque curve values are limited by the capability of the source of power such as fuel cells. Therefore, weakening the field excitation to cause speed up at constant horsepower provides a smoothing operation in this curve temporarily before switching to the high speed winding connection requiring paralleling of the coil portions noted earlier. Actually only a fraction of a second is needed to effect change in stator connection switching for weakening and then the field excitation is returned to full value. The change in stator connection switching can involve a slight delay up to a fraction of a second due to inductive reactance but such a time interval is of no consequence because smoothing of the transition from series to parallel connection is particularly desirable. It is to be understood that in place of two parallel sets of coil winding portions it would also be possible to provide three and more sets of such coil winding portions connectable in series or in parallel but then switching therebetween becomes more complicated.

It is to be noted that reversal of operation can be accomplished either by field reversal or by 180° shift or switching positions. Such electronic switching can occur quickly and is preferred since field reversal may require a longer time interval for decay of flux fields due to inductive reactance. Both transistors and silicon-control rectifier devices have been satisfactorily used for switching purposes.

Physical structure of the polyphase A.C.-type stator winding depends to some extent on the particular type of operation desired. If the motor is to be used strictly as a self-commutated D.C. machine, the arrangement physically can differ slightly from what would be used if it were to be "slaved" to some external trigger signal. For delta stator winding connection the highest current is carried by that portion of the windings which couples the maximum field. If the windings are connected in a three-phase Y-type configuration, those windings in the maximum flux area will carry no current. In a conventional D.C. machine all windings carry current at all times whether or not they are in a position to contribute to the torque. Appreciable improvement in output per unit size and weight is realized since in effect an A.C. armature winding is fitted into stator slots where more space is available for windings than on a conventional D.C. rotating armature. It is to be noted that any suitable power source including solar cell panels could be provided as a source of energy for the subject machine and control system.

Synchronous A.C. motors are caused to rotate by a system of interacting poles set up within the motor. The rotor has permanent poles created by a permanent magnet or electromagnet. The stator has a system of alternate north and south poles set up by the A.C. excitation current and the system of poles rotates around the machine at a frequency related to the A.C. power applied. As the stator field rotates, it causes the rotor to follow it due to interaction of the stator field with the static field of the rotor.

The D.C. machine in accordance with the present invention uses a similar principle but the field in the stator is caused to rotate by proper sequential programming of the D.C. current in the stator windings. As previously described, a matrix of solid state switches has been arranged and properly timed to accomplish this rotation of the stator field. The triggering system controls the switching matrix to determine the rotor angle at which the switching will occur to keep the stator field leading the rotor by the proper amount to produce maximum torque. When properly switched, the motor will produce very smooth torque output even at very low speeds.

The same switching system and triggering devices can be used to operate the motor when the triggering signals are not dependent on rotor position. In this mode of operation, the triggering might be controlled by a variable frequency oscillator and cause the motor to be "slaved" to the oscillator. A series of pulses actuating the trigger system could cause the motor to rotate through an angle proportional to the number of pulses applied. Use of multiple windings per phase enhances capabilities of the subject motor. Use of series-parallel connectable dual winding portions per phase permits two separate torque-speed characteristics to be provided by the same machine while transition can be smoothed due to variation in field current control.

As in a conventional D.C. motor, the field current has the capability of controlling the speed-torque characteristic of the machine over a limited range. From the foregoing description, it is apparent that the subject brushless D.C. machine and control system for use therewith offers a wide range of flexibility. The high speed capability of this motor will permit production of machines with very high ratios of horsepower-to-weight. It also provides advantageous ratio of horsepower per unit of weight at any particular speed. The facility to switch the torque-speed characteristics eliminates need for gear changing or conventional transmission means and in effect, provides an electrical torque convertor. Provision of a gearbox adjacent to each wheel is distinguished from the function of such a transmission or gear changing device. In view of the brushless control system the subject machine can be used for actuator work even under vacuum conditions. Thus, the subject machine and control is not limited to ground vehicles but also can be used for aircraft and related devices either directly or remotely controlled by an operator or built-in control mechanism on such a vehicle. The brushless D.C. machine provides all of the advantages of a conventional D.C. machine without speed limitations and problems associated with commutators and brushes. Expensive and impractical use of series resistors is avoided as would be provided for speed control on conventional motors.

It is apparent that if a motor vehicle is equipped with the subject vehicle propulsion and control system, it is possible to avoid use of breaker points or signal pickoffs which are velocity responsive on internal combustion engines as currently used. The new system provides a position pickoff when the vehicle is static or barely moving at a slow rate of speed. Furthermore, the velocity responsive breaker pickoffs could not carry high currents and would arc and fail. A vehicle equipped with the propulsion and control system in accordance with the present invention can be used with A.C. road control and thus, the motor can be A.C. as well as D.C. If a fuel cell is used as a source of power carried by the vehicle, it is possible to tap off certain values of power at the cell at various plateaus below 100 percent efficiency ratings and these plateaus can be augmented by supplemental power switched complementary thereto. A fuel cell will operate indefinitely if working properly and provided with efficient waste disposal. Catalytic materials are being perfected to make use of fuel cells practicable. However, as indicated earlier, the vehicle propulsion and control system in accordance with the present invention could also be used with a gas turbine vehicle and the like. Each arm of the Y-connected stator winding means can be energized to have current flowing in either of opposite directions and the semi-conductor devices serve as switches in a circuit to gate passage of energizing current in various directions in the stator windings. However, it is to be noted that it would also be possible to use eight such switching positions or even numbered increments thereof with a corresponding number of transistors or SCR devices. Use of magnetic signal pickoff means for interruption and triggering of the SCR devices by provision of a non-magnetic member or disc such as 35 rather than a substitute therefor provides sharp on and off operation of the transistor or SCR devices. An electronic circuit could be used for plus or minus relay operation for forward and reverse. Since semi-conductor devices will not carry current in reverse, switching must be accomplished so as to effect reversal of field current.

While the embodiments of the present invention as herein disclosed constitute preferred forms, it is to be understood that other forms might be adopted.

What is claimed is as follows:

1. An electric motor comprising, first and second stationary windings each having a plurality of winding sections, a plurality of semiconductor switching devices, input terminals adapted to be connected with a source of direct current, means connecting said winding sections of said first and second windings with said semiconductor switching devices, means connecting said semiconductor switching devices with said input terminals, said semiconductor switching devices being adapted to provide a path for direct current between said input terminals and said windings, means for controlling the conduction of said semiconductor switching devices in accordance with rotor position and in a predetermined sequence as determined by rotor position, said sequence being such that a rotating magnetic field is produced in said first and second windings as said rotor rotates, and means for connecting said winding sections in series or in parallel to control motor speed.

2. A vehicle propulsion system comprising, at least one driving wheel for said vehicle, an electric motor having first and second stationary three phase windings and a rotor, said rotor being mechanically coupled to said wheel to drive said wheel, a field winding for said rotor, said rotor having a plurality of circumferentially spaced magnetic poles provided by energization of said field winding, a source of direct current carried by said vehicle, six semiconductor switching devices, means connecting said six semiconductor switching devices in a three phase full wave bridge network, said bridge network having three output terminals connected respectively with the phase windings of said first and second three phase windings and having two input terminals connected across said source of direct current, a control means for sensing the angular position of said rotor connected with said six semiconductors switching devices and operative to cause pairs of said semiconductor switch devices to become conductive in a predetermined sequence, said pairs of semiconductor switches when conductive completing a circuit for pairs of respective phase windings of said first and second three phase windings in a predetermined sequence and being operative to cause current to flow in opposite directions through said phase windings whereby a rotating magnetic field is produced in said stator winding which is related to the angular position of said rotor, and means for connecting the phase windings of said first and second three phase windings in series or in parallel.

3. An electric motor system comprising, a stationary three phase Y-connected winding, six semiconductor switches, a source of direct current, a pair of input conductors connected across said source of direct current, six energizing paths for energizing pairs of phase windings of said three phase winding connected across said input conductors, each path comprising in a series connection one of said input conductors, one of said semiconductor switches, a pair of phase windings, another semiconductor switch and the other input terminal, a triggering means responsive to the angular position of said rotor, and means coupling said triggering means to said semiconductor switches whereby said six paths are brought into operation in a predetermined sequence, said sequential energization of said pairs of phase windings providing a rotating magnetic field in said stationary three phase winding, and a field winding for said motor for varying the speed torque characteristic of said motor.

4. An electric motor comprising, a three phase Y-connected winding formed of a plurality of pairs of phase windings, a rotor having a plurality of magnetic poles rotatable with respect to said winding, six semiconductor switches, means connecting said six semiconductor switches in a three phase full wave bridge network having three output terminals and two input terminals, said input termnials being adapted to be connected with source of direct current, said output terminals being connected respectively with the phase windings of said three phase winding, and control means responsive to the angular position of said rotor for causing said semiconductor switches to conduct in pairs and in a predetermined sequence, said pairs of semiconductor switches when conductive being connected in series with two phase windings of said three phase winding across said input terminals, the sequence of conduction of said semiconductor switches being such that pairs of phase windings are energized in a predetermined sequence to provide a rotating magnetic field in said three phase winding, said system being arranged such that a predetermined angular relationship is maintained between said rotating magnetic field and the magnetic poles of said rotor to provide maximum torque for said machine, means for connecting said pairs of phase windings in series or in parallel, a field winding for said motor, and means for varying the energization of said field winding.

5. An electric motor system comprising, a stationary polyphase winding formed of phase windings which are connected together, a rotor rotatable with respect to said polyphase winding, a plurality of semiconductor switches, power input terminals adapted to be connected with a source of voltage connected with said semiconductor switches, means connecting said semiconductor switches with said polyphase winding, and a control means responsive to the angular position of said rotor and connected with said semiconductor switches for causing pairs of said switches to be conductive during a predetermined period of time in a predetermined sequence as determined by the angular position of said rotor, each pair of semiconductor switches when conductive being connected in series and connecting at least one phase winding of said polyphase winding across said input terminals through the pair of series connected semiconductor switches, said pairs of semiconductor switches being conductive in such a sequence that current reverses through a given phase winding, the sequence of conduction of said pairs of semiconductor switches as determined by the angular position of said rotor being such that a rotating magnetic field is produced in said polyphase winding, said rotor member following the rotating magnetic field produced in said polyphase winding, said control means which is responsive to the angular position of the rotor including a plate member rotatable with the rotor and operative to control the magnetic coupling between two windings one of which is energized by an oscillator.

6. An electric motor system comprising, a stationary polyphase winding formed of phase windings which are connected together, a rotor rotatable with respect to said polyphase winding, a plurality of semiconductor switches, power input terminals adapted to be connected with a source of voltage connected with said semiconductor switches, means connecting said semiconductor switches with said polyphase winding, a control means responsive to the angular position of said rotor and connected with said semiconductor switches for causing pairs of said switches to be conductive during a predetermined period of time in a predetermined sequence as determined by the angular position of said rotor, each pair of semiconductor switches when conductive being connected in series and connecting at least one phase winding of said polyphase winding across said input terminals through the pair of series connected semiconductor switches, said pairs of semiconductor switches being conductive in such a sequence that current reverses through a given phase winding, the sequence of conduction of said pairs of semiconductor switches as determined by the angular position of said rotor being such that a rotating magnetic field is produced in said polyphase winding, said rotor member following the rotating magnetic field produced in said polyphase winding, and means for connecting portions of said polyphase winding in series or in parallel.

References Cited by the Examiner

UNITED STATES PATENTS

| 2,325,927 | 8/1943 | Wilber. | |
| 2,820,915 | 1/1958 | Mathews | 310—168 |
| 2,978,599 | 4/1961 | Wilcox | 310—168 |
| 2,980,839 | 4/1961 | Haeussermann | 318—138 |
| 3,016,482 | 1/1962 | Anderson et al. | 310—162 |
| 3,025,443 | 3/1962 | Wilkinson et al. | 318—138 |
| 3,027,959 | 4/1962 | Mailliard | 180—65 X |
| 3,089,992 | 5/1963 | Seney | 318—341 |
| 3,096,467 | 7/1963 | Angus et al. | 318—138 |
| 3,109,131 | 10/1963 | Byrd | 318—341 |
| 3,115,600 | 12/1963 | Brolin | 323—22 |
| 3,124,732 | 3/1964 | Dupy | 318—138 |
| 3,129,368 | 4/1964 | Burnett | 318—327 |
| 3,138,752 | 6/1964 | De Blasio | 323—22 |

ORIS L. RADER, *Primary Examiner.*

JOHN F. COUCH, *Examiner.*

S. GORDON, G. Z. RUBINSON, *Assistant Examiners.*